Feb. 27, 1945.   R. I. MARKEY   2,370,559
CUSHION MOUNT FOR COWL AND MANIFOLD SUPPORTING MEANS
Filed March 31, 1943   2 Sheets-Sheet 1
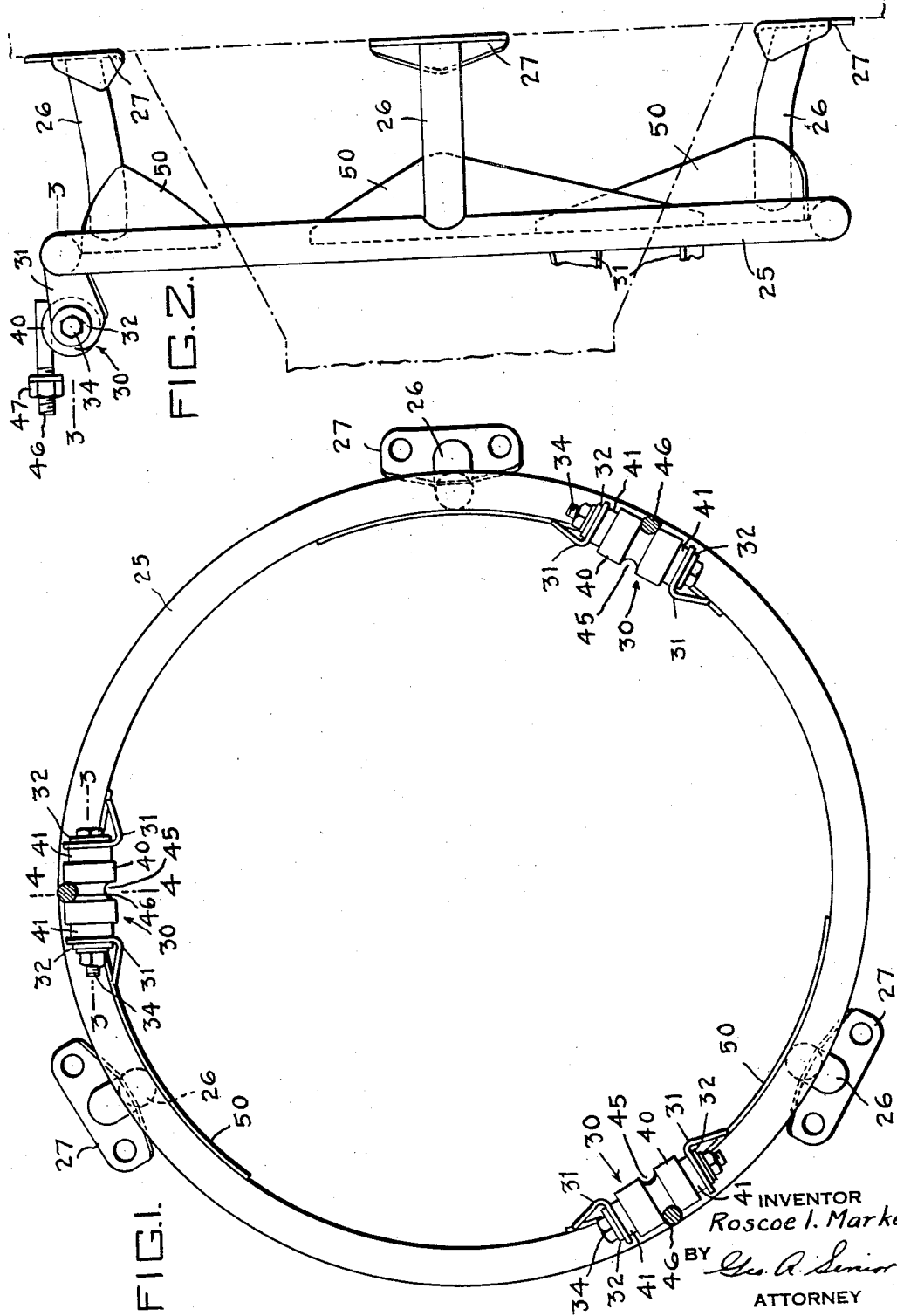
INVENTOR
Roscoe I. Markey
BY
Geo. A. Senior
ATTORNEY Feb. 27, 1945. R. I. MARKEY 2,370,559
CUSHION MOUNT FOR COWL AND MANIFOLD SUPPORTING MEANS
Filed March 31, 1943 2 Sheets-Sheet 2
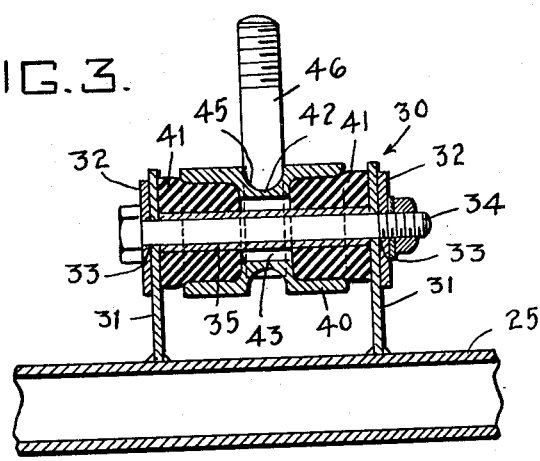
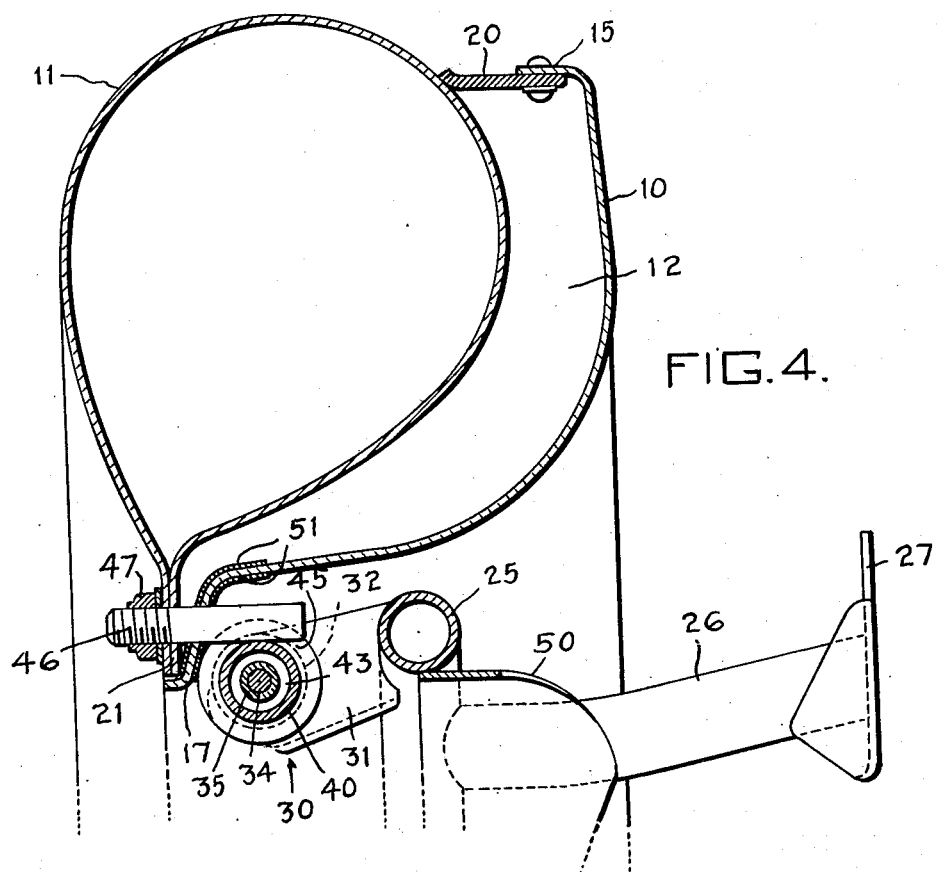
INVENTOR
Roscoe I. Markey
BY
ATTORNEY Patented Feb. 27, 1945

2,370,559

UNITED STATES PATENT OFFICE 2,370,559

CUSHION MOUNT FOR COWL AND MANIFOLD SUPPORTING MEANS

Roscoe I. Markey, East Orange, N. J., assignor to Pollak Manufacturing Company, Arlington, N. J., a corporation of New Jersey Application March 31, 1943, Serial No. 481,364

6 Claims. (Cl. 248—358)

The invention relates to a cushion mount for cowl and manifold supporting means and is particularly adapted for use in connection with cowling and exhaust collector systems of radial-type aircraft engines.

It is well known intense heat is set up in exhaust collectors or manifolds of aircraft engines and this heat is naturally transferred to the cowling which is in close proximity to the collector ring. Thus high stresses and strains are set up both in the cowl and manifold and in the supporting means therefor, the same being due to the expansion and contraction caused by the heating and cooling. In addition a substantial amount of vibration results from the operation of the engine, particularly when the engine is running at high speed. Either of these conditions by itself and more particularly the combination of both result in extremely grave problems arising in devising efficient means to properly support and secure the cowl and manifold in position.

The principal object of the present invention is the provision of an extremely simple means to efficiently support and positively position the cowling and manifold of a radial-type aircraft engine in proper relation to each other and to the engine regardless of stresses and strains set up by expansion and contraction and vibration.

Obviously the natural place to support the cowl and manifold is on the engine. In accordance with the invention a cushion mount is provided which supports the cowl and manifold strongly and firmly and yet will permit of sufficient movement in all directions to compensate for all stresses and strains caused by heating and cooling of the parts or vibration thereof.

Other objects and advantages will become apparent as this specification proceeds. Referring to the drawings forming a part thereof and in which a preferred form of the invention is illustrated, Fig. 1 is a front elevation of the cowl and manifold supporting means with the cushion mounts carried thereby;

Fig. 2 is an edge view;

Fig. 3 is a detail sectional view on a larger scale taken on the line 3—3 of Fig. 2; and Fig. 4 is a detail sectional view taken on the line 4—4 of Fig. 1, a typical section of the cowling and manifold being illustrated.

The invention has to do with a type of cowling and manifold generally illustrated in my prior Patent No. 2,247,393, dated July 1, 1941. In this patent the cowling and manifold were secured to and directly supported by the engine. A further development in the art is disclosed in my prior Patent No. 2,264,706, dated December 2, 1941. In this patent a supporting ring having rearwardly extending legs secured to the engine was utilized to carry the cowling and manifold. However it was found in practice that occasionally the supporting ring or its legs would become fractured due to sufficient flexibility not being insured. The present invention contemplates the use of a similar supporting ring and legs and the supporting ring carries the cushion mounts for the cowling and manifold.

Referring again to the drawings the cowl is designated by the reference numeral 10 and comprises a spun ring of light metal and of uniform radial cross section at all points.

As illustrated the cowl is so shaped in cross section as to somewhat conform with one-half of the exhaust manifold 11 and provide an air space 12 for heating air for the carburetor. However various sections of exhaust manifold and cowl might be utilized without in any way departing from the spirit of the invention. The heated air may be led to the carburetor through an off-take pipe (not shown).

Formed on the outer circumferential edge of the cowl 10 is a forwardly extending flange 15. At what might be termed the inner edge of the cowl is an inwardly extending flange 17. Riveted or otherwise secured to the flange 15 is a strip of asbestos 20 or other strong and durable material having a certain degree of flexibility. The strip of asbestos functions to complete the closure for the annular hot air space 12. The strip of asbestos 20 is not continuous for the complete circumference of the flange 15, thus leaving an opening (not shown) through which the cool air may be admitted into the annular air space 12. The flexibility of the strip 20 readily permits of it accommodating itself to different shapes of exhaust manifold.

The front of the air space may be sealed by a flange 21 on the manifold collector ring. However in exhaust manifold collector rings which do not have a flange a suitable filler piece may be utilized to seal the air space.

As illustrated the mounting means is formed in part of a rigid tubular ring 25 which has welded or otherwise secured thereto rearwardly extending feet 26, any number of which may be employed. Welded or otherwise fastened to the inner ends of the feet are plates 27 having apertures through which bolts may pass to firmly secure the mounting ring to the engine. The structure thus far described is conventional and is illustrated in my prior Patent No. 2,264,706, dated December 2, 1941.

A plurality of cushion mounts each designated generally by the reference numeral 30 are mounted on and extend forwardly from the ring 25. As all of the cushion mounts are alike a description of one will suffice.

The cushion mounts are carried by a pair of angle brackets 31 welded or otherwise secured to the ring 25. The supporting legs of the brackets 31 extend forwardly and washers 32 are resistance welded thereto to reinforce the legs at the region where openings 33 are provided for the reception of a through stud 34.

The stud 34 is surrounded by a bushing or sleeve 35 which is confined between the inner faces of the supporting legs. Mounted between the supporting legs is a retainer member 40, ample clearance being allowed between the ends thereof and the inner faces of the supporting legs.

The retainer member has pockets at either end for the reception of resilient blocks 41 formed of heat resisting rubber or other suitable material. The blocks 41 are crowded into the pockets and closely confined between the inner ends of the pockets and the inner faces of the supporting legs and between the internal circumferential surfaces of the pockets and the sleeve 35. The blocks 41 have central openings through which the sleeve 35 passes and they are tightly confined between the sleeve and the interior longitudinal surfaces of the pockets.

The retainer member has a central partition 42 which is provided with an opening 43 through which the stud 34 and its sleeve 35 pass, the sleeve as illustrated in Fig. 3 having ample clearance in the opening 43.

The retainer member 40 has a groove 45 formed thereon and a forwardly extending stud 46 is welded or otherwise secured in this groove. The stud passes through suitable openings in the cowl flanges 17 and manifold ring flanges 21 and its outer end is threaded for the reception of a lock nut 47 for maintaining the cowl and manifold ring in proper relation to each other and to the supporting means.

It is thought to be apparent from the foregoing description that no matter in which direction twists or turns may come due to distortion or vibration the cushion mounts will provide sufficient movement to compensate for such twists or turns and yet at all times will positively and firmly support the cowl and manifold ring. The rubber blocks may be compressed longitudinally or radially and naturally any component in between will be provided for. It may be said flexibility is accomplished by permitting the rubber cushions 41 to flow into the space 43 between the sleeve 35 and interior of the retainer member and out through the space between the ends of the retainer member 40 and the supports 31.

It will be noted the cushion mounts 30 are placed in a position where they are exposed to and will receive the cool air from the slip stream while the aircraft is in flight. If the warm air alone from the manifold contacted the cushion mounts the life of the cushions would be materially shortened.

Gusset plates 50 may be provided to reinforce the ring 25 at the regions where the legs 26 and cushion mounts 30 are secured to the ring; and the cowl may be provided with reinforcing plates 51 at the regions where the studs 46 pass therethrough.

Such changes in details of construction and arrangements of parts as would occur to one skilled in the art are to be considered as coming within the spirit of the invention as set forth in the appended claims.

I claim:

1. A cushion mount for cowl and manifold supporting means comprising an annular ring, said annular ring having rearwardly extending feet for mounting it on and securing it to the engine, and forwardly extending studs for securing the cowl and manifold to said ring and in proper relation to each other, and cushion mounts interposed between said annular ring and said forwardly extending studs to compensate for stresses and strains in all directions which are set up by distortion and vibration.

2. A cushion mount for cowl and manifold supporting means comprising an annular ring, said annular ring having means on one side for securing it to the engine, and cushion mounts on the other side for securing the cowl and manifold to said ring in proper relation to each other and to compensate for stresses and strains in all directions which are set up by distortion and vibration, said cushion mounts comprising brackets extending forwardly from said annular ring, and shock absorbing means carried by said brackets.

3. A cushion mount for cowl and manifold supporting means comprising an annular ring, said annular ring having means on one side for securing it to the engine, and cushion mounts on the other side for securing the cowl and manifold to said ring in proper relation to each other and to compensate for stresses and strains in all directions which are set up by distortion and vibration, said cushion mounts comprising brackets extending forwardly from said annular ring, studs carried by said brackets, and shock absorbing means carried by said studs.

4. A cushion mount for cowl and manifold supporting means comprising an annular ring, said annular ring having means on one side for securing it to the engine, and cushion mounts on the other side for securing the cowl and manifold to said ring in proper relation to each other and to compensate for stresses and strains in all directions which are set up by distortion and vibration, said cushion mounts comprising brackets extending forwardly from said annular ring, studs carried by said brackets, retainer members supported on said studs, and shock absorbing means carried by said retainer members.

5. A cushion mount for cowl and manifold supporting means comprising an annular ring, said annular ring having means on one side for securing it to the engine, and cushion mounts on the other side for securing the cowl and manifolds to said ring in proper relation to each other and to compensate for stresses and strains in all directions which are set up by distortion and vibration, said cushion mounts comprising brackets extending forwardly from said annular ring, studs carried by said brackets, sleeves extending between said brackets and carried by said studs, retainer members having pockets, and cushioning means confined in the pockets in said retainer members between said brackets and said pockets.

6. A cushion mount for cowl and manifold supporting means comprising an annular ring, said annular ring having means on one side for securing it to the engine, and cushion mounts on the other side for securing the cowl and manifold to said ring in proper relation to each other and to compensate for stresses and strains in all directions which are set up by distortion and vibration, said cushion mounts comprising brackets extending forwardly from said annular ring, studs carried by said brackets, sleeves extending between said brackets and carried by said studs, retainer member having pockets, cushioning means confined in the pockets in said retainer members between said brackets and said pockets, and forwardly extending studs carried by said retainer members, the cowl and manifold being secured to and carried by said forwardly extending studs.

ROSCOE I. MARKEY.